(12) United States Patent
Hayden et al.

(10) Patent No.: US 8,396,776 B2
(45) Date of Patent: Mar. 12, 2013

(54) DYNAMIC CALCULATIONS IN AN EMPLOYEE COMPENSATION SYSTEM

(75) Inventors: Ty Hayden, Grand Junction, CO (US); Anadi Upadhyaya, Hyderabad (IN); Manish Agrawal, Campbell, CA (US); David Cohanoff, Beverly Hills, CA (US)

(73) Assignee: Oracle International Corporation, Redwood Shores, CA (US)

( * ) Notice: Subject to any disclaimer, the term of this patent is extended or adjusted under 35 U.S.C. 154(b) by 347 days.

(21) Appl. No.: 12/365,955

(22) Filed: Feb. 5, 2009

(65) Prior Publication Data
US 2010/0198634 A1    Aug. 5, 2010

(51) Int. Cl.
*G06Q 40/00* (2012.01)
(52) U.S. Cl. ........................................ 705/36 R; 705/35
(58) Field of Classification Search .................... 705/35, 705/36 R
See application file for complete search history.

(56) References Cited

U.S. PATENT DOCUMENTS

| 5,717,939 | A | * | 2/1998 | Bricklin et al. | 715/212 |
| 7,233,919 | B1 | | 6/2007 | Braberg et al. | |
| 7,383,217 | B2 | | 6/2008 | Calderaro et al. | |
| 2003/0046196 | A1 | * | 3/2003 | Kelly | 705/32 |
| 2005/0188352 | A1 | * | 8/2005 | Jager et al. | 717/106 |
| 2006/0178905 | A1 | * | 8/2006 | Ayers et al. | 705/1 |
| 2006/0259401 | A1 | * | 11/2006 | West et al. | 705/37 |
| 2007/0033519 | A1 | * | 2/2007 | Zdenek | 715/503 |
| 2007/0256004 | A1 | * | 11/2007 | Payette | 715/503 |
| 2008/0270577 | A1 | * | 10/2008 | Walrath | 709/219 |

* cited by examiner

*Primary Examiner* — Muriel Tinkler
(74) *Attorney, Agent, or Firm* — Squire Sanders (US) LLP

(57) ABSTRACT

Systems and methods for setting up dynamic calculations within compensation software are described in the present disclosure. According to one embodiment among many, a compensation module for managing compensation for a number of employees includes a dynamic calculation set-up module allowing a user to set up a dynamic calculation. The dynamic calculation includes a calculation for one column of a worksheet based in part on a value in another column. The compensation module also includes a condition builder allowing a user to enter a condition and a result as part of a dynamic calculation. In particular, a column associated with the result receives a calculated value when the condition is met.

25 Claims, 9 Drawing Sheets

Setup Compensation Plan: Define Dynamic Calculations [Back] [Save ▼] [Cancel]

Plan Name Global Salary Raise - 2008

Property CustomSegment31
Property Label Performance Adjusted Target — 52    *ExeOrder [ 1 ]— 50

| Order Number | Default | Condition | Result |
|---|---|---|---|
| No rows yet. | | | |
| 42 | 44 | 46 | 48 |

Condition Builder                                          [✕]

* OrderNum [            ]            Default ☐

⊟ Condition

62— (?) [...Select Condition Variable ▼] (?)
     (?) [...Select Condition Operator ▼]
                              68   66

⊟ Result - Expression                76

64— [...Select Result Variable ▼] (?)
     [...Select Result Operator ▼]
                   74         72

[Done] [Cancel]

DYNAMIC CALCULATIONS IN AN EMPLOYEE COMPENSATION SYSTEM

TECHNICAL FIELD

The present disclosure generally relates to compensation software applications for handling compensation for employees of a corporation. More particularly, the embodiments described herein relate to systems and methods for creating dynamic calculations within compensation software.

BACKGROUND

Many corporations use compensation software to manage the salaries, bonuses, and other types of compensation for a number of employees. Based on several factors, such as work experience, work performance, position, etc., the compensation software can be run to determine pay increases, bonuses, etc. Also, by using customized calculations, a compensation administrator can attempt to create a compensation plan that is fair to all employees.

In order to apply certain compensation rules for the corporation, the compensation administrator can create dynamic calculations, which can use information stored in one column of a worksheet or spreadsheet and perform calculations on this information to generate additional information. For example, if a company-wide bonus is designed to compensate each employee based on years of experience, then a "Years of Experience" number is used from one column to calculate the "Bonus" in another column. Therefore, dynamic calculations enable a compensation administrator to automatically derive values within one column upon the entry or update of information into another column, which is comparable to cell calculations that are performed in a conventional spreadsheet.

SUMMARY

The present disclosure describes several embodiments of systems, methods, and processing logic. Regarding one particular embodiment, a compensation module for managing compensation for a number of employees is described. The compensation module includes a dynamic calculation set-up module allowing a user to set up a dynamic calculation, which includes a calculation for one column of a worksheet based in part on a value in another column. The compensation module also includes a condition builder allowing a user to enter a condition and a result as part of a dynamic calculation, where a column associated with the result receives a calculated value when the condition is met.

Other features, advantages, and implementations of the present disclosure, not expressly disclosed herein, will be apparent to one of ordinary skill in the art upon examination of the following detailed description and accompanying drawings. It is intended that such implied implementations of the present disclosure be included herein.

BRIEF DESCRIPTION OF THE DRAWINGS

The components of the following figures are illustrated to emphasize the general principles of the present disclosure. Reference characters designating corresponding components are repeated as necessary throughout the figures for the sake of consistency and clarity.

FIG. 3 is a diagram of a graphical user interface (GUI) for dynamic calculation set-up, according to one embodiment.

FIGS. 4-12 are diagrams of a condition builder GUI and a process of entering data in the condition builder, according to a number of embodiments.

DETAILED DESCRIPTION

Figure 1:
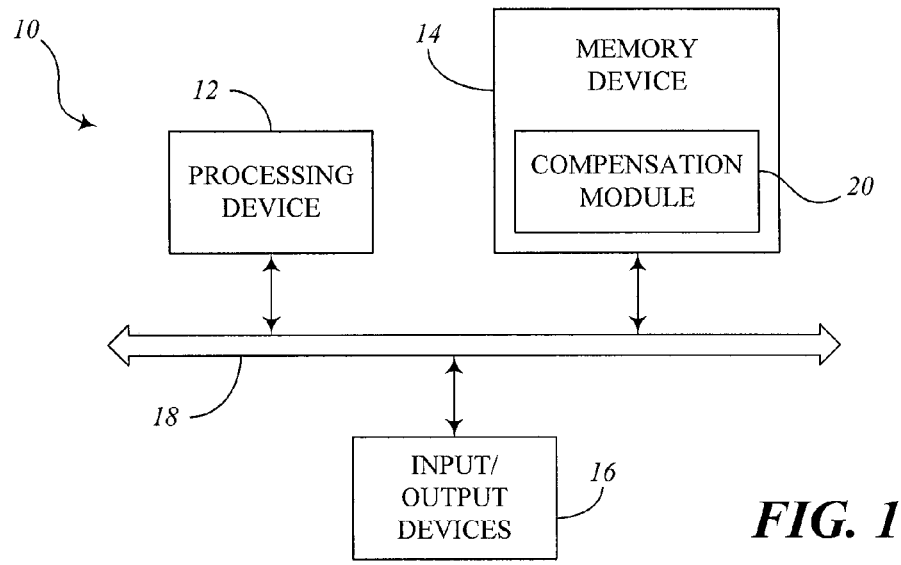
FIG. 1 is a block diagram illustrating a computing system according to one embodiment.

Compensation software applications are used by corporations and others to manage the salaries, bonuses, and other types of compensation for a plurality of employees. Usually, a compensation administrator runs and maintains the compensation software applications to control salary changes, distribute bonuses, and for other tasks related to compensation. In order to standardize a corporation's rules regarding compensation, dynamic calculations can be created within the software. Generally, dynamic calculations refer to the use of information from one or more columns of a worksheet or spreadsheet to calculate additional information, which can be stored or presented in another column. Dynamic calculations allow the software user, such as the compensation administrator, to automatically derive values upon the entry or update of values in one or more other columns.

Furthermore, as described in the present disclosure, the calculated values can be based, at least in part, on "conditions." For instance, when a condition is set up, the compensation software application can determine if the condition is met. Then, if it is determined that the condition is met, the software can perform a specific calculation or set a variable to a specific fixed value. The following is an example of such a condition and a corresponding result: If the condition "column A=X" is met, then the result include setting the "dynamic column B=Y." According to the embodiments disclosed herein, the present compensation systems and software applications are capable of evaluating not only a single dynamic calculation, but also multiple dynamic calculation ordered in a predetermined sequence, according to sequence numbers defined for each dynamic calculation.

Furthermore, the user can define dynamic columns to include calculations and conditions. Also, the embodiments of the present disclosure enable the user to use basic math operations, such as addition, subtraction, multiplication, division, etc. The user is able to select a predefined column from a list of several columns to use in the calculations in a worksheet or table, such as one associated with a graphical user interface. In this regard, the columns can either be hidden or displayed. If desired, the user can enter a fixed value based on values of other columns or based on certain conditions. Also, the user can choose among multiple relational operators, such as "equal to," "not equal to," "greater than," "less than," etc. The user can combine multiple relational operators to make complex conditions.

Conventional compensation software normally would not allow a user to define dynamic calculations without a participation process run, which involves the running of the software on actual compensation data of a number of participants. Therefore, the user would have to access an allocation worksheet to configure dynamic calculations, which normally requires a participation process run. However, according to the embodiments described in the present disclosure, a compensation administrator or other user can define dynamic calculations without a participation process run.

In addition, conventional compensation software usually allows users to enter calculations and conditions using a drop down list for selection. However, according to the embodiment described herein, a display window is provided that allows a user to enter data directly within the window or change data in the window. This improvement allows users having various levels of expertise to be able to use the program. For example, advanced users can utilize the free-form entry in the windows to update or define new conditions and calculations and hence avoid the multiple step process while defining dynamic calculations.

Furthermore, the present disclosure describes embodiments related to testing systems and methods for allowing the user to test dynamic calculation on demand, which, up until now, did not exist in compensation software. In this regard, the user can check the results of defined conditions and calculation by providing test values. This can help in eliminating any oversights that might be made during data entry while defining conditions and results.

The compensation software applications described herein can also return a dynamic calculation based on numeric columns or even non-numeric columns, such as text and date information. In this regard, a character recognition program can be run to identify various alphanumeric characters. Alphanumeric columns can be obtained using string concatenation and a date column can also be derived based on other date columns. Also, numeric dynamic columns can be marked as "monetary" and can be used in currency conversion. Dynamic calculation results can be mapped to an element and then can be posted for payroll processing. Numeric dynamic calculation results can be rounded by a rounding code.

Dynamic calculations can be chained with an execution sequence, which means that users can make use of previously defined dynamic calculations while defining new ones. For example, if a user has defined a dynamic calculation for column 1 and is in the process of defining a dynamic calculation for column 2, then the user can make use of the dynamic calculation in column 1 if needed. Execution sequence tells the system which dynamic calculation to calculate first and can be referred to in other dynamic calculations as well.

Although the embodiments described in the present disclosure are primarily directed to software applications, it should be recognized that the embodiments can apply to any type of logic processing systems and methods, which may include any combination of software, hardware, and/or firmware. In addition, although the embodiments described herein define aspects of compensation processing, it should also be recognized that the embodiments can also pertain to any type of logical processing.

FIG. 1 is a block diagram of an embodiment of a computing system 10. Particularly, computing system 10 may be a computer, data processing system, or other suitable electronic device for executing logic instructions, e.g., software applications. In the embodiment shown in FIG. 1, computing system 10 includes a processing device 12, a memory device 14, and input/output devices 16, each interconnected via a bus interface 18. Memory device 14 includes, among other things, a compensation module 20.

Processing device 12 may be a general-purpose or specific-purpose processor or microcontroller. Memory device 14 may include one or more internally fixed storage units, removable storage units, and/or remotely accessible storage units. Also, memory device 14 may include any suitable combination of volatile memory and/or non-volatile memory and can be configured to store information, data, instructions, and/or software code. Input/output devices 16 may include input mechanisms such as keyboards, keypads, cursor control devices, or other data entry devices. The input mechanisms enable a user to enter information or instructions in computer system 10. Input/output devices 16 may also include output devices, such as computer monitors, display screens, audio output devices, printers, or other peripheral devices for communicating information to the user.

Generally, computing system 10 can include processing means for handling compensation information for a corporation, enterprise, or other entity. The compensation information can be accessed from related human resources applications or other types of applications within the corporation or enterprise. The compensation information can then be stored in memory device 14. The compensation information may contain information regarding salary, bonus, stock options, benefits, etc., for a number of employees.

More specifically, computing system 10 can include logic adapted to enable a user to set up dynamic calculations in compensation software. The set-up logic can allow the user to enter fixed values, calculations, conditions, etc. Particularly, a condition builder can be part of the processing means to enable a user to easily create conditions. Furthermore, the processing means of computing system 10 also includes, among other components, a dynamic calculation tester, which allows a user to test how a dynamic calculation might operate during a normal participation process run. The tester can provide helpful feedback to the user to ensure that the dynamic calculations might work as intended without any significant deficiencies.

Figure 2:
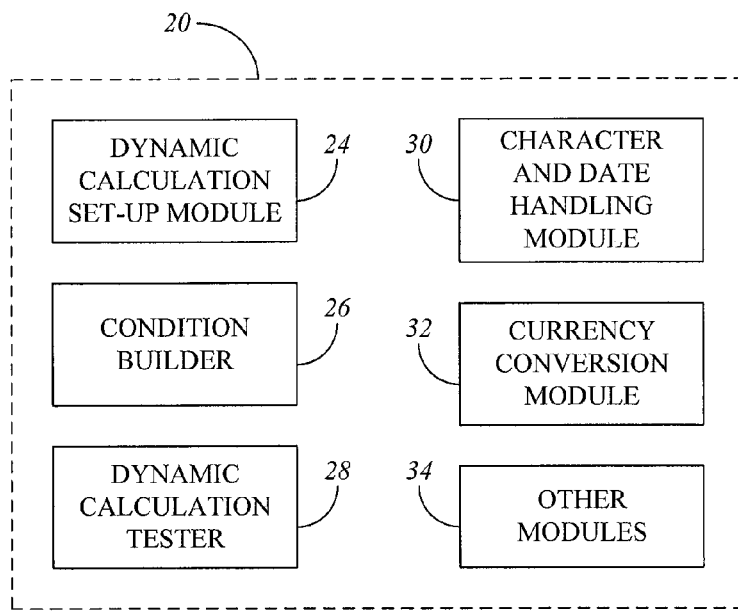
FIG. 2 is a block diagram illustrating the compensation module shown in FIG. 1, according to one embodiment.

FIG. 2 is a block diagram showing an embodiment of compensation module 20 shown in FIG. 1. In this embodiment, compensation module 20 includes a dynamic calculation set-up module 24, a condition builder 26, a dynamic calculation tester 28, a character and date handling module 30, a currency conversion module 32, and other modules 34.

The embodiments of compensation module 20 described in the present disclosure can be implemented in hardware, software, firmware, or a combination thereof. When implemented in software or firmware, compensation module 20 can be stored in memory device 14 (FIG. 1) and executed by processing device 12. Alternatively, when implemented in hardware, compensation module 20 can be implemented in processing device 12 using discrete logic circuitry, an application specific integrated circuit (ASIC), a programmable gate array (PGA), a field programmable gate array (FPGA), or any combination thereof.

Compensation module 20, in addition to other software, computer programs, or logic code that includes executable logical instructions as described herein, can be embodied in a computer-readable medium for execution by any suitable processing device. The computer-readable medium as described herein can include one or more suitable physical media components that can store the software, programs, or code for a measurable length of time.

Dynamic calculation set-up module 24 enables a user to set up dynamic calculations on a graphical user interface (GUI), worksheet, or spreadsheet. According to some implementations, dynamic calculation set-up module 24 may be associated with the GUIs shown in FIGS. 3, 13, and 14, as described in more detail below. With dynamic calculation set-up module 24, the user can enter certain conditions and resulting values or calculations when the conditions are met.

Condition builder 26 include means for enabling a user to enter one or more conditions within a dynamic calculation. For example, condition builder 26 may be associated with the GUIs shown in FIGS. 4-12 according to some implementations. Condition builder 26 may include several drop down menus along with several options for each drop down menu or may use other types of selection mechanisms. In this respect, condition builder 26 allows the user to make selections that control how the conditions are created. Also, condition builder 26 can show the results of the condition creation selections in one or more windows, which allow the user to see the format of each condition and how the creation of the conditions is progressing. The user can also enter data directly in these windows of condition builder 26, if the user desires. In this way, an experienced user can bypass many selection steps and enter data directly, according to the particular format used for defining the conditions.

Dynamic calculation tester 28 includes means for enabling the user to test how the dynamic calculations might actually work in a regular process run. This test can be run after the user has entered the dynamic calculations according to the procedures involved with respect to dynamic calculation set-up module 24 and/or condition builder 26. Dynamic calculation tester 28 can be run so that the user can check to make sure the results of a number of dynamic calculations are reasonable and that the calculations, conditions, and/or results are entered correctly.

Character and date handling module 30 can be used in the background of compensation module 20 to evaluate alphanumeric characters in a string of characters. Since calculations in typical compensation modules usually only include numbers, character and date handling module 30 can further handle a string of concatenated characters. In this respect, character and date handling module 30 is able to manage dates, which may include non-numeric characters, and other alphanumeric characters. Therefore, one or more columns of a worksheet or spreadsheet that are defined with alphanumeric characters can be broken down by character and date handling module 30 to handle the different aspects of the entries. Also, character and date handling module 30 can evaluate a monetary value by removing a non-numeric monetary symbol, such as "$," and perform calculations on the numeric portion of the monetary entry.

Also, currency conversion module 32, which may be used in parallel with character and date handling module 30, allows certain numbers to be defined as monetary values. In this case, monetary symbols can be evaluated by currency conversion module 32 to determine the monetary unit, which can be compare with respect to current exchange rates of other monetary units. In addition, currency conversion module 32 enables the user to convert from one monetary system to another, which might be based on the employee's country of residency or other factors.

The other modules 34 may include normal compensation logic for accomplishing typical compensation operations and functions. In addition, according to some embodiments, the other modules 34 may include retrieving functionality for retrieving the compensation information that is used in the processing by compensation module 20. For instance, the compensation information may be received by user entries with respect to input/output devices 16 or, in some embodiments, may include accessing information from external sources, such as related human resources applications, payroll applications, or other applications that may be associated with the enterprise. The retrieved compensation information can be gathered and organization as needed. Furthermore, the other modules 34 may include storage modules for storing the compensation information therein or in suitable storage units of memory device 14.

FIG. 3 is an embodiment of a GUI 40 for dynamic calculation set-up, enabling a user to set up one or more dynamic calculations. The dynamic calculation set-up can be made within a compensation plan or within any other suitable program that includes dynamic calculations. In this embodiment, GUI 40 includes an order number column 42, a default column 44, a condition column 46, and a result column 48. GUI 40 also includes, among other things, an execution order field 50 and a dynamic calculation tester icon 52. GUI 40 may be called up by a user using any suitable means, such as a mouse click on a button or icon within compensation module 20, for example.

The order number column 42 defines the order in which a number of conditions are evaluated and executed. For example, a specific dynamic calculation may include any number of conditions. Order number column 42 gives an order, starting with "1," for example, which defines when each condition is evaluated.

The execution order field 50 indicates the order in which a number of defined dynamic calculations are to be executed. For example, if two dynamic calculations are defined, each having a number of conditions involved therewith, execution order determines which dynamic calculation as a whole is executed first.

The default column 44 allows a user to enter a specific value or a specific calculation without the need of a condition. In this respect, if a default value is selected, then a condition is not needed. However, for a condition and result scenario, condition column 46 is used to show a number of conditions and the results are shown in result column 48 for defining the corresponding results when a respective condition is met. In order to create a condition and its corresponding result, the user can use a "Condition Builder" to define the dynamic calculations. The following figures show the GUIs and steps that the user can take in order to create a condition/result scenario. The following figures also show the GUIs and steps that the user can take to set up a default value when no condition is needed.

FIGS. 4-12 show a number of embodiments of a GUI 56 representing a Condition Builder, which can be accessed from GUI 40 of FIG. 3. Furthermore, the figures show examples of a sequence of data entry processes within GUI 56 for fully completing a condition. As illustrated in FIG. 4, GUI 56 includes an order number field 58, a default field 60, a condition section 62, and a result section 64. Condition section 62 includes a condition variable selection field 66, a condition operator selection field 68, and a free-form field 70. Result section 64 includes a result variable selection field 72, a result operator selection field 74, and free-form field 76.

Figure 5:
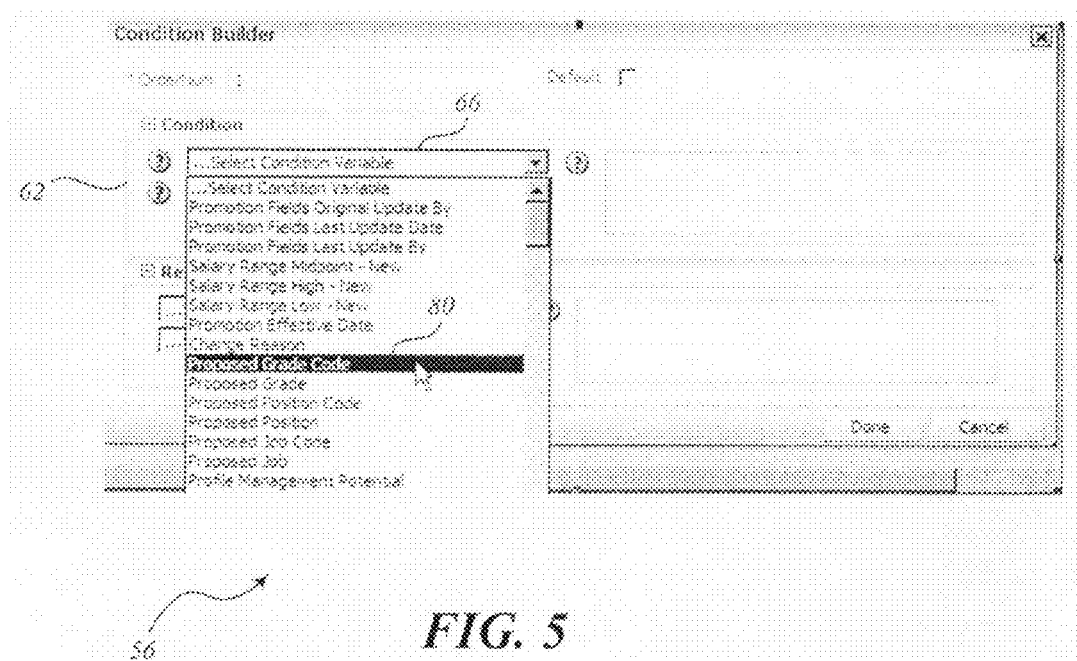
Figure 6:
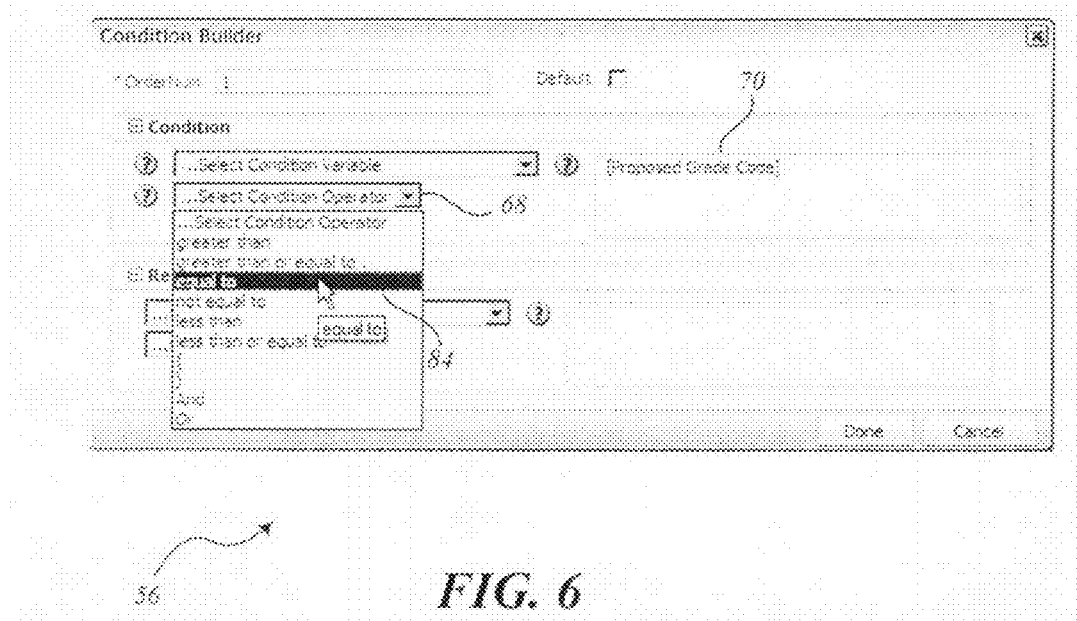
Figure 7:
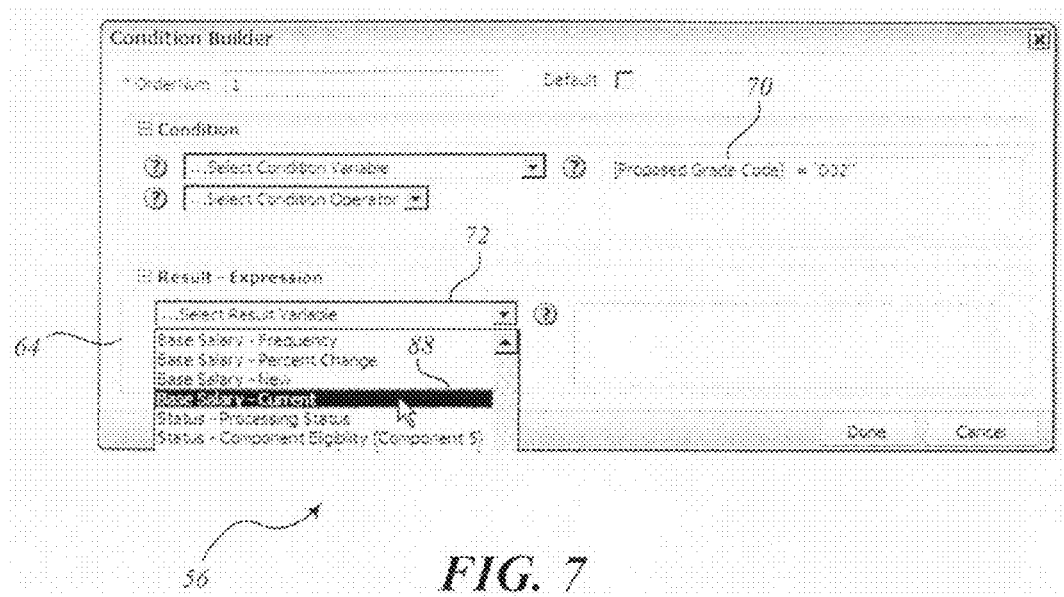

FIG. 5 shows an example of the beginning selections of a condition. In particular, this view shows that the condition variable from condition variable selection field 66 being selected. In this example, "Proposed Grade Code" 80 is selected. When selected, this condition variable is displayed in free-form field 70, as illustrated in FIG. 6. Also in FIG. 6, a condition operator is selected from condition operator selection field 68. In this particular example, "equal to" 84 is selected from condition operator selection field 68 and shown in free-form field 70 as shown in FIG. 7. In this example, the code "D32" is entered from another drop down menu by a free-form entry in order to complete the condition creation method. The code "D32," for example, merely represents an internal code for a Proposed Grade Code, which in this case represents a sales director.

Figure 8:
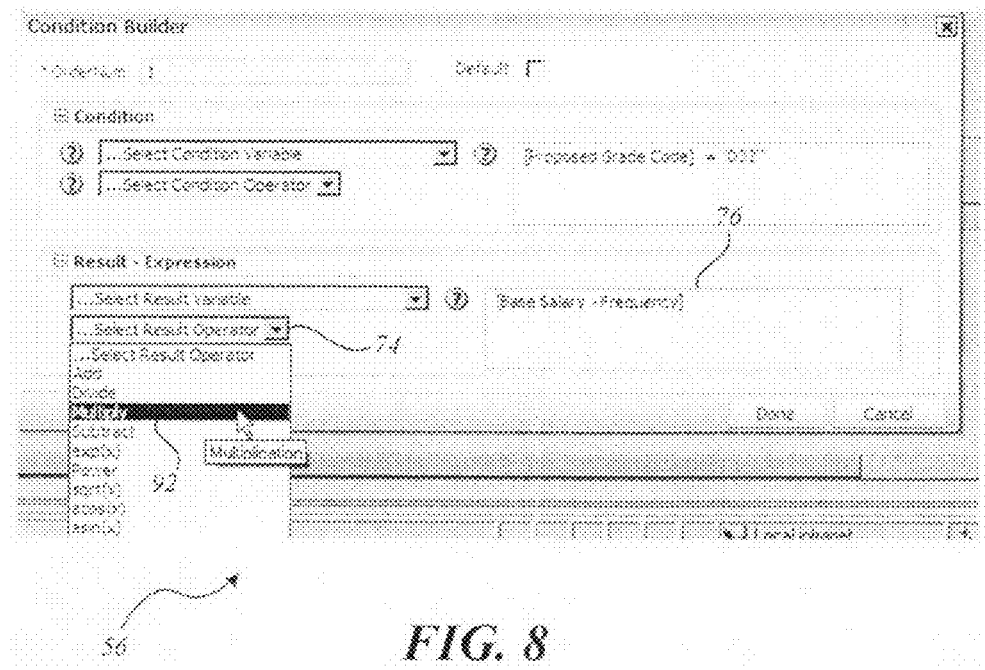
Figure 9:
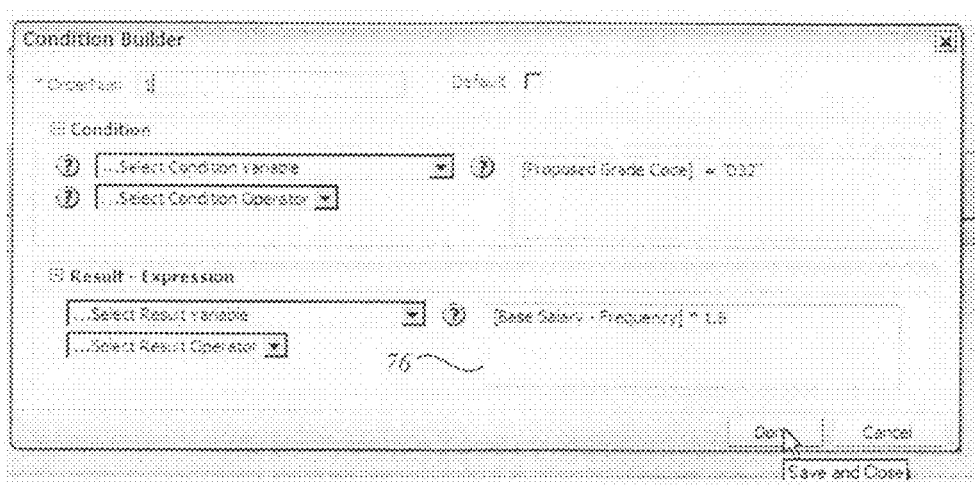

FIG. 7 also shows an example of the user's selections with respect to result section 64. Particularly, a result variable is selected from result variable selection field 72. Specifically, "Base Salary–Current" 88 is shown as being selected. The selection is shown, for example, in free-form field 76 associated with result section 64, as illustrated in FIG. 8. Next, FIG. 8 shows an example of the selection of a result operator from result operator selection field 74. Particularly, the mathematical operator "multiply" 92 is selected and the multiplication is displayed in free-form field 76 as shown in FIG. 9. In addition, the user can enter a value that is multiplied by the selected result variable, i.e., Proposed Grade Code. In this case, the value "1.8" is entered.

According to the embodiments described herein, free-form fields 70 and 76 show the results of the selections made by the user using the drop down selection list. However, as an alternative, the user can enter information directly into fields 70 and 76 if desired. If the user is already accustomed to the format of the conditions, the user can enter the information while bypassing the step-by-step procedure described with respect to FIGS. 4-9. Therefore, a novice user might use the step-by-step method while a more experience user might feel confident to enter by using the free-form method.

Figure 10:
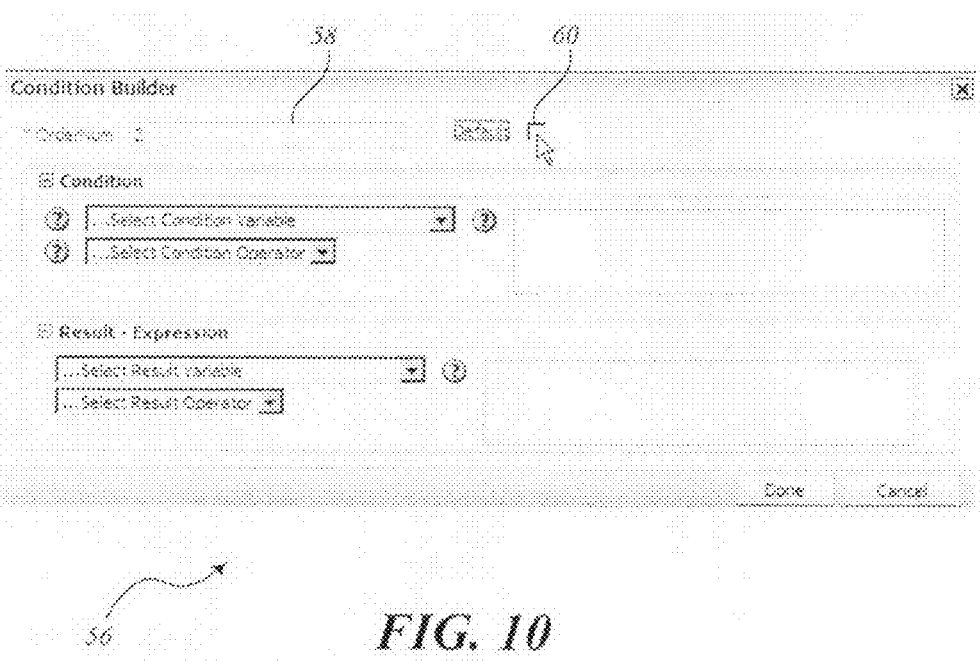
Figure 11:
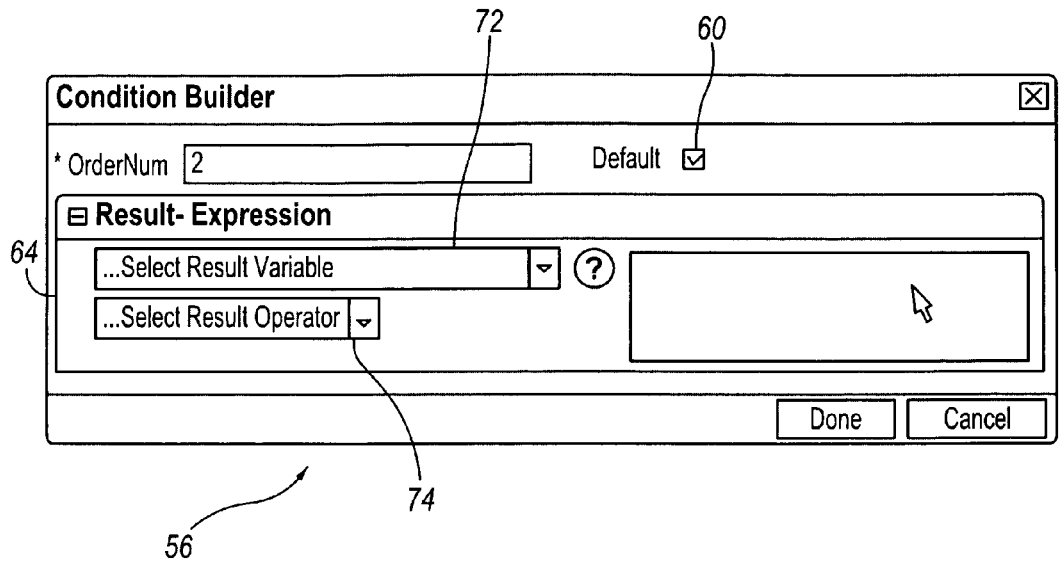
Figure 12:
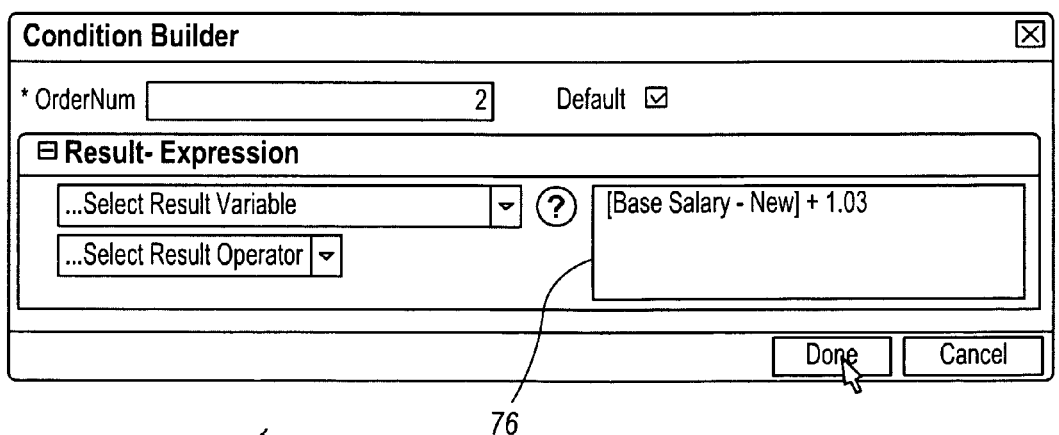

It is shown in FIGS. 4-9 that a condition can be created, wherein a result column receives the result defined in result section 64 when the condition defined in condition section 62 is met. FIGS. 10-12 show another example of condition builder 56 in which the user can also make use of default logic. The user can select default button or default box of default field 60 to create a value or calculation as a default for a certain variable without the introduction of any conditions. In this case, a condition is not used but a defaulting result for a variable is entered.

To start a new condition or defaulting result, the user enters a new number in order number field 58 to distinguish it from the first condition and to determine the order in which the condition will be run. Any number and any order can be used based on the user's preferences. Next, the user can click or select the box in the default field 60 when a default is being entered. In response, GUI 56 displays the arrangement shown in FIG. 11. In particular, only result section 64 is shown since condition section 62 is not needed. It should be intuitive, even to a novice user, that the default mode does not depend on a condition, but defaults a certain variable or column to a certain value or calculation. In this respect, result variable selection field 72 and result operator selection field 74 are shown in result section 64. The user can select using the drop down menus or enter variables and operators by the free-form method. In this example, as shown in FIG. 12, free-form field 76 shows the result of "[Base Salary–New]×1.03," which is intended in this example to increase the specific base salary by 3%.

Figure 13:
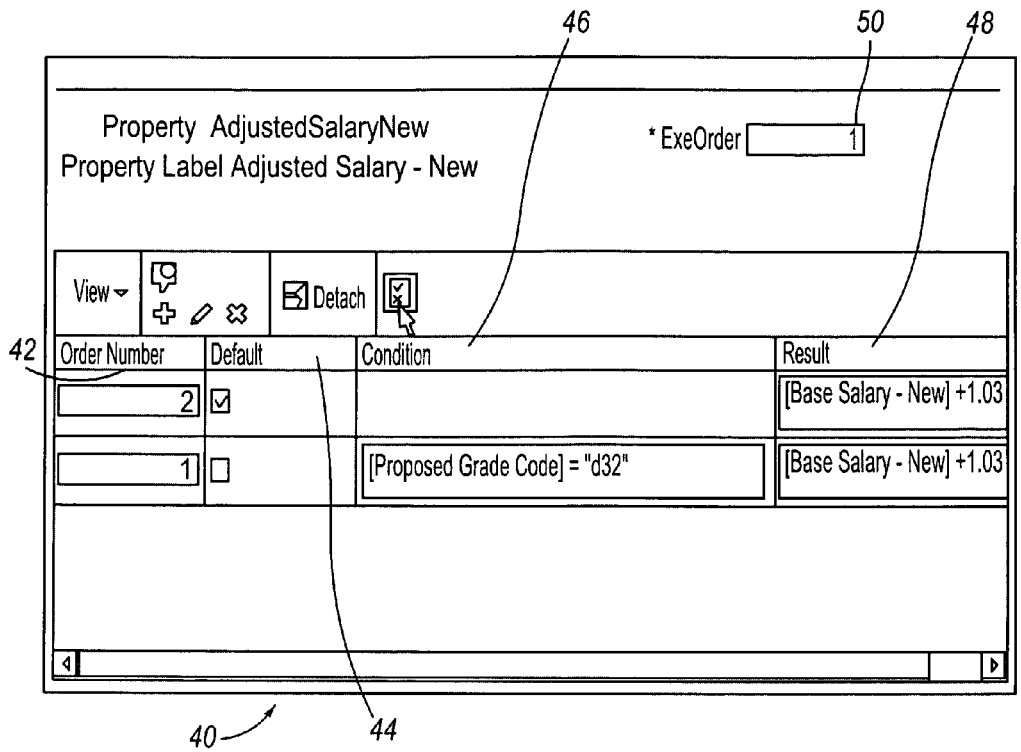
FIG. 13 is a diagram of the GUI of FIG. 3 illustrating the results of the data entered in the processes shown in FIGS. 4-12, according to one embodiment.

FIG. 13 is an embodiment of GUI 40 of FIG. 3 showing the results of the two dynamic calculations entered by the processes described with respect to FIGS. 4-12. This example shows the view presented to the user after performing the steps described above for entering the two conditions. Regarding the first dynamic calculation, identified by order number 1 in order number column 42, condition builder was used to create a condition involving the Proposed Grade Code and the result, which would be followed through if the condition is met, involves a new salary increase. The second dynamic calculation having order number 2 in order number column 42 includes a default result, as identified by the checked default box in default column 44. The default does not require a condition, which is shown as being grayed out in column 46 in this case, but a result includes salary increase in this example. This group of dynamic calculations is run in the order shown in order number column 42. Also, this group is executed first before other groups of dynamic calculations, as indicated by the "1" in execution order field 50.

In other embodiments, GUI 40 may include any number of constants, any number of mathematical operators, and any number of columns. These can be linked dynamically in any desirable manner. For example, suppose that a condition is entered defined by the following: If ((Performance Rating=4) and ((Country='US') or (Total Experience>5 years))). In this example, the variables Performance Rating, Country and Total Experience would represent the number of columns in the condition. The numerical operators in this case include "=," ">," "and," and "or," and the numbers "4" and "5" are the constants. In addition, since alphanumeric columns can be defined and evaluated by character and date handling module 30 (FIG. 2), various portions of the alphanumeric characters, which are concatenated strings of characters, can be extracted as needed. Also, date columns can also be defined and evaluated. These extra columns can be added by the user using compensation module 20. Some examples of various conditions that can be entered in this system may include the following:

Total Compensation Amount=New Salary+Bonus+ Monetary Value of Stock

Custom Name=Last Name+","+First Name+":"+ Country Code (e.g., US)

Next Data Refresh Date=Current Data Refresh Date+3 (which means that Next Data Refresh Date will be three days after the Current Data Refresh Date)

Total Work Experience=(Date of Joining–Data Freeze Date)+Previous Work Experience (where Data Freeze Date can be any date including the current date)

Figure 14:
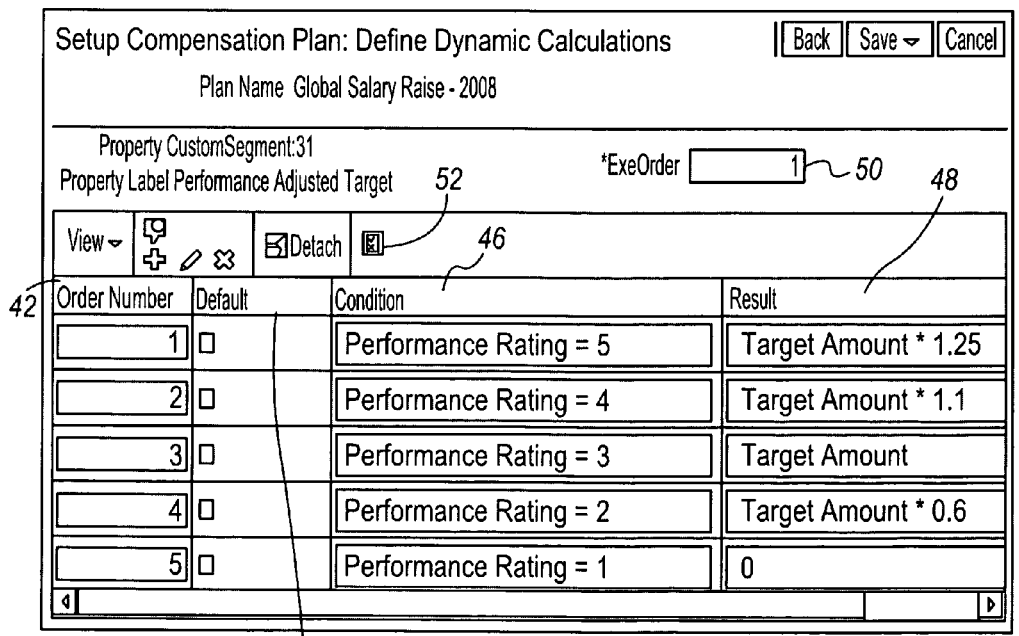
FIG. 14 is a diagram of the GUI of FIG. 3 illustrating the result of data entry for another dynamic calculation set-up, according to another embodiment.

FIG. 14 is an embodiment of GUI 40 of FIG. 3 showing the results of conditions of another dynamic calculation entered using the Condition Builder. Suppose a corporation sets targets as guidelines at the organization level based on management decisions. In this scenario, the performance of a number of employees is ranked from 1 to 5, where 1 is poor performance and 5 is excellent performance. Also suppose that the compensation administrator gives a performance weighting of 1.25 to a performance ranking of 5, a weighting of 1.1 to a ranking of 4, a weighting of 1.0 to a ranking of 3, a weighting of 0.6 to a ranking of 2, and a weighting of 0.0 to a ranking of 1. In this example, conditions, results, and calculations are entered such that employee compensation is based on an employee's Target Amount multiplied by a Performance Weighting.

Using the Condition Builder, the user can define the condition as being a Performance Rating equal to 5, 4, 3, 2, or 1, evaluated in the order shown in order number column 42. These conditions, i.e., Performance Rating=5, Performance Rating=4, etc. represent the five conditions shown in condition column 46. The "result" calculations are shown in result column 48 for a "Adjusted Target Amount" that is equal to the Target Amount multiplied by the Performance Weighting. GUI 40 shown in FIG. 14 shows the result the entry of these conditions in Condition Builder. The process may also include putting the Adjusted Target Amount, which is the result in result column 48, in a related worksheet for allocating the amount to the respective employee. The results can be changed to a monetary form as necessary and can also be rounded as necessary using a rounding code to include two numerals after the decimal point.

When the user has created one or more dynamic calculations, the conditions, results, and calculations can be tested outside of the regular compensation operations. This allows the user to see how the results may look without affecting actual compensation or employee data. In order to test a dynamic calculation, the user can click on dynamic calculation tester icon 52.

Figure 15:
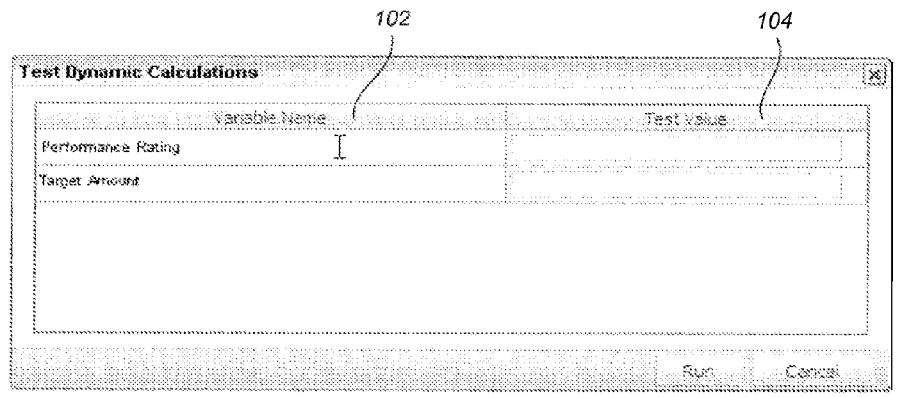
FIGS. 15 and 16 are diagrams of a dynamic calculation tester GUI, according to one embodiment.
Figure 16:
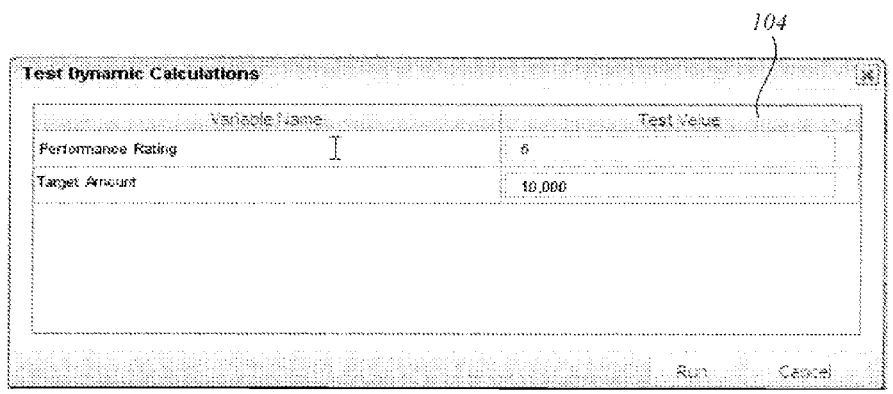

FIGS. 15-16 illustrate embodiments of a GUI 100 representing a dynamic calculation tester, which enables a user to test one or more dynamic calculations entered using dynamic calculation set-up module 24 (FIG. 2). Dynamic calculation tester GUI 100 includes a variable name column 102 and a test value column 104. In this example, a test is performed on the conditions, results, and calculations related to the Adjusted Target Amount described above with respect to FIG. 14. Once the dynamic calculation tester is launched, the user can enter test values in test value column 104. The tester can report if there are any errors found in the defined calculations, such as dividing by zero or other errors.

Figure 17:
FIG. 17 is a diagram of a window showing result values of a dynamic calculation test performed by the dynamic calculation tester described with respect to FIGS. 15 and 16, according to one embodiment.

Specifically, the variable names of the dynamic calculations in FIG. 14 include the Performance Rating from condition column 46 and Target Amount from result column 48. When test values are entered, the user can click on the Run button, which calculates the results, as shown in window 108 of FIG. 17. Window 108 shows the results of the dynamic calculation test representing the running of dynamic calculation tester of FIGS. 15 and 16.

Figure 18:
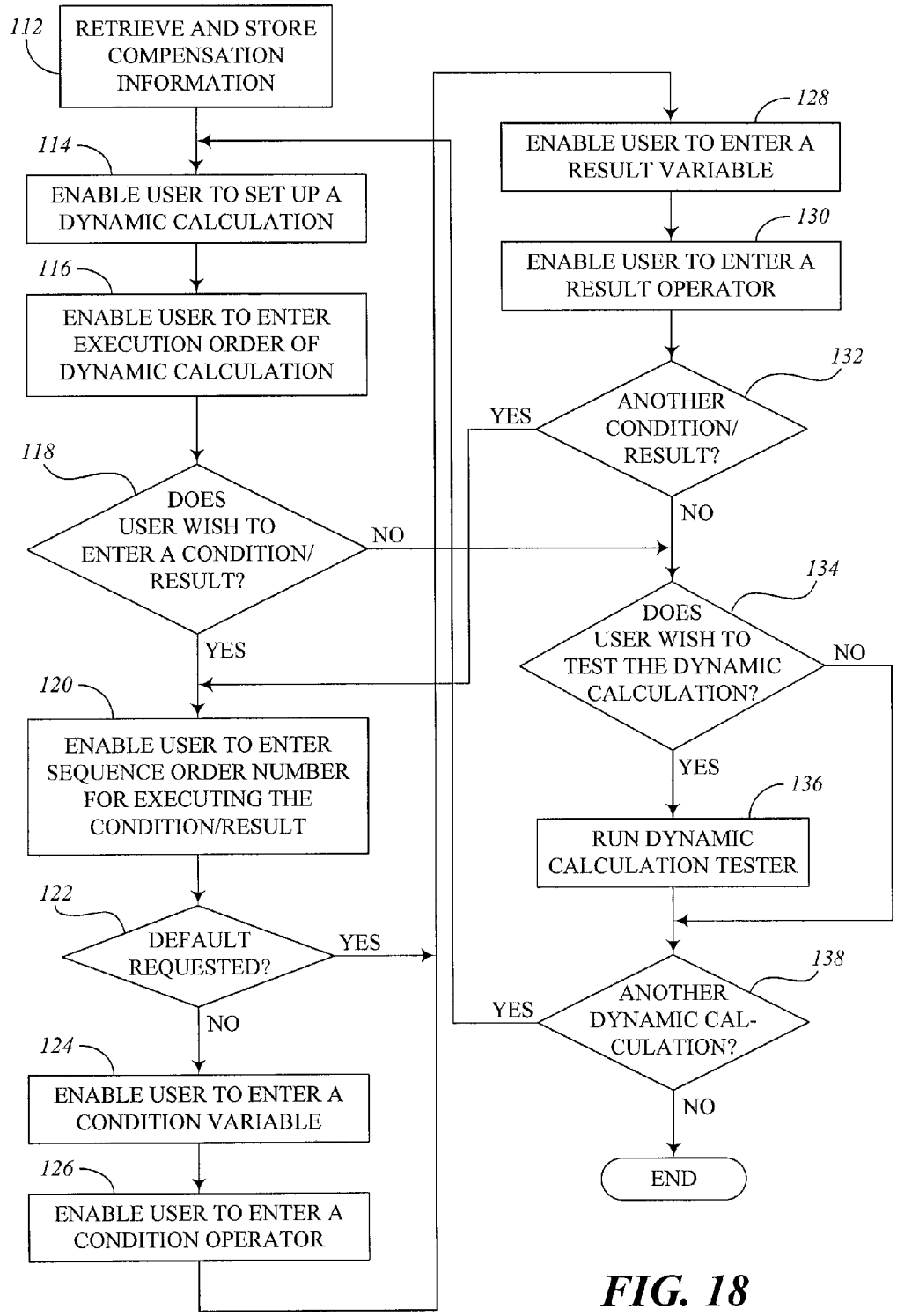
FIG. 18 is a flow diagram illustrating a method of a compensation application, according to one embodiment.

FIG. 18 is a flow diagram illustrating an embodiment of a method of a compensation application, such as compensation module 20. In this embodiment, compensation information is retrieved and stored, as indicated in block 112. According to block 114, the method enables the user to set up a dynamic calculation. The user is enabled to enter an execution order of the dynamic calculation relative to other dynamic calculations, as indicated in block 116.

In decision block 118, it is determined whether the user wishes to enter a condition/result. The condition/result may include a default result where a condition is not needed or a regular condition in which a result is effected when the condition is met. If the user does not wish to enter a condition/result, the method skips ahead to block 134. Otherwise, the method proceeds to block 120. As indicated in block 120, the user is enabled to enter a sequence order number for which the condition/result is executed with respect to other condition/result entries.

As indicated in decision block 122, it is determined whether or not the user requests a default result, which is a calculation that does not rely on the occurrence of a condition. If a default result is requested, the method bypasses the condition set-up processes and skips ahead to block 128. Otherwise, if default is not requested, then the method proceeds to block 124. In block 124, it is indicated that the user is enabled to enter a condition variable. Then, the user is enabled to enter a condition operator, as indicated in block 126. Also, the user can enter a constant, which is combined with the condition variable and condition operator.

In block 128, the user is enabled to enter a result variable, and in block 130, the user is enabled to enter a result operator. In addition, the user can enter a constant, which is combined with the result variable and result operator. This completes the entry of a condition/result. As indicated in decision block 132, it is determined whether or not the user wishes to enter another condition/result. If so, the method returns back to block 120 to repeat the entry process for another condition/result. If the user does not wish to enter another condition/result, the method proceeds to decision block 134. Blocks 124 and 126 can be repeated multiple times if necessary to allow a user to define multiple conditions. Similarly, blocks 128 and 130 can be repeated multiple times while defining multiple results. This can be done for complex conditions and result values based on the particular requirements.

In block 134, it is determined whether or not the user wishes to test the dynamic calculation, which uses one or more of the entered condition/result. If so, the method proceeds to block 136, which indicates that a dynamic calculation tester is run to test the entered dynamic calculation. However, if testing is not desired, the method bypasses the tester process and skips to decision block 138. As indicated in block 138, it is determined whether or not the user wishes to enter another dynamic calculation. If so, the method returns back to block 114 to begin the entry process for another dynamic calculation. However, if no more dynamic calculations are to be entered, the method ends.

It should be understood that the steps, processes, or operations described herein may represent any module or code sequence that can be implemented in software or firmware. In this regard, these modules and code sequences can include commands or instructions for executing specific logical steps, processes, or operations within physical components. It should further be understood that one or more of the steps, processes, and/or operations described herein may be executed substantially simultaneously or in a different order than explicitly described, as would be understood by one of ordinary skill in the art.

The embodiments described herein represent a number of implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

We claim:

1. A compensation system for managing compensation for a number of employees, the compensation system comprising:
    memory that stores compensation information regarding a number of employees;
    a dynamic calculation set-up module that allows a user to set up a dynamic calculation that includes a compensation calculation for one column of a worksheet based in part on a portion of the compensation information in another column; and
    a condition builder comprising an order number field, default field, condition section, and result section,
    wherein the condition builder receives, from a user, a compensation condition and a result as part of the dynamic calculation, wherein a column associated with the result receives a calculated compensation value when the compensation condition is met,
    wherein the dynamic calculation set-up module is further configured to allow the user to set up multiple dynamic calculations and define an order in which the dynamic calculations are executed.

2. The compensation system of claim 1, wherein the dynamic calculation set-up module is further configured to allow the user to set up multiple dynamic calculations and define an order in which the dynamic calculations are executed.

3. The compensation system of claim 1, wherein the condition builder is further configured to allow the user to create multiple compensation conditions and define an order in which the compensation conditions are evaluated.

4. The compensation system of claim 1, wherein the condition builder is further configured to enable the user to create the compensation condition and result using a step-by-step procedure.

5. The compensation system of claim 4, wherein the condition builder includes one or more drop down menus for controlling the step-by-step procedure.

6. The compensation system of claim 1, wherein the condition builder is further configured to enable the user to create the compensation condition and result using a free-form procedure.

7. The compensation system of claim 1, wherein the condition builder is further configured to enable the user to enter a default value for a result that does not depend on a compensation condition.

8. The compensation system of claim 1, further comprising a dynamic calculation tester allowing a user to test an entered dynamic calculation.

9. The compensation system of claim 8, wherein the dynamic calculation tester can be run with test values.

10. The compensation system of claim 9, wherein the dynamic calculation tester can be run without execution of actual compensation processes.

11. The compensation system of claim 1, further comprising a character and date handling module configured to handle alphanumeric characters in columns of the worksheet.

12. The compensation system of claim 1, further comprising a currency conversion module configured to define a value as a monetary value and enabling the user to convert the monetary value into an equivalent value under a different monetary unit.

13. A computer readable medium configured to store instructions that are executable by a processing device, the computer readable medium comprising:
logic adapted to perform compensation functions related to compensation information associated with a number of employees of a corporation;
logic adapted to enable a user to select a condition variable, a condition operator, and a first constant, the condition variable being selected from a first list of compensation variables; and
logic adapted to enable the user to select a result variable, a result operator, and a second constant, the result variable being selected from a second list of compensation variables;
wherein a condition is met if the condition variable is related to the first constant as defined by the condition operator; and
wherein a result is effected when the condition is met, the result including the result variable being operated on with the second constant by the result operator.

14. The computer readable medium of claim 13, wherein the logic adapted to enable the user to select the condition variable, condition operator, and first constant is further adapted to allow the user to select the condition variable and condition operator from a predefined list of variables and operators.

15. The computer readable medium of claim 14, wherein the logic adapted to enable the user to select the result variable, result operator, and second constant is further adapted to allow the user to select the result variable and result operator from a predefined list of variables and operators.

16. The computer readable medium of claim 13, wherein the logic adapted to enable the user to select the condition variable, condition operator, and first constant is further adapted to allow the user to enter the condition variable, condition operator, and first constant into a first free-form field.

17. The computer readable medium of claim 16, wherein the logic adapted to enable the user to select the result variable, result operator, and second constant is further adapted to allow the user to enter the result variable, result operator, and second constant into a second free-form field.

18. The computer readable medium of claim 13, wherein the logic adapted to enable a user to select a condition variable, a condition operator, and a first constant and the logic adapted to enable a user to select a result variable, a result operator, and a second constant are further adapted to enable the user to select multiple sets of variables, operators, and constants.

19. The computer readable medium of claim 13, further comprising logic adapted to test a dynamic calculation that incorporates the condition and result.

20. A system for entering dynamic calculations, the system comprising:
a processor connected to memory;
the processor configured to:
enable a user to set-up a dynamic calculation using a plurality of columns of a compensation worksheet;
receive from the user, in a condition builder, a compensation condition for the dynamic calculation, the compensation condition being associated with at least a first column of the compensation worksheet, wherein the condition builder comprises an order number field, default field, condition section, and result section; and
calculate a result in a second column of the dynamic calculation when the compensation condition is met.

21. The system of claim 20, further comprising means for enabling the user to test the dynamic calculation that is set up by the user.

22. The system of claim 20, wherein the compensation worksheet is associated with a graphical user interface.

23. A method comprising:
storing, by a memory, compensation information of a number of employees of an enterprise;
enabling, by a processor, a user to set up a dynamic calculation, which includes a calculation of at least a portion of the compensation information;
enabling the user to select between a default result and a condition/result as part of the dynamic calculation;
enabling the user to enter, using a condition builder, a condition variable and condition operator if the condition/result is selected, wherein the condition builder comprises an order number field, default field, condition section, and result section; and
enabling the user to enter a result variable and result operator;
wherein a result is effected when a condition is met or when a default result is selected.

24. The method of claim 23, wherein the method further comprises running a dynamic calculation tester on the dynamic calculation set up by the user.

25. The method of claim 23, wherein the method further comprises enabling the user to enter a sequence order number for executing a plurality of dynamic calculations.

* * * * *